United States Patent
Gross et al.

(10) Patent No.: US 10,220,701 B2
(45) Date of Patent: Mar. 5, 2019

(54) UTILITY VEHICLE TANK

(71) Applicant: MAGNA STYER Fuel Systems GesmbH, Sinabelkirchen (AT)

(72) Inventors: Jörg Gross, Wessling (DE); Bernd Kahler, Graz (AT); Michael Schmid, Graz (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 320 days.

(21) Appl. No.: 14/471,292

(22) Filed: Aug. 28, 2014

(65) Prior Publication Data

US 2015/0060468 A1    Mar. 5, 2015

(30) Foreign Application Priority Data

Aug. 28, 2013    (EP) .................................... 13182105

(51) Int. Cl.
*B60K 15/03*    (2006.01)
*B60K 15/077*    (2006.01)

(52) U.S. Cl.
CPC .. *B60K 15/077* (2013.01); *B60K 2015/03105* (2013.01); *B60K 2015/03111* (2013.01); *B60K 2015/03282* (2013.01); *B60K 2015/0775* (2013.01); *B60K 2015/0777* (2013.01)

(58) Field of Classification Search
CPC .. B60K 2015/03111; B60K 2015/0777; B60K 2015/030105; B60K 15/077
USPC ....................................................... 220/563
See application file for complete search history.

(56) References Cited

U.S. PATENT DOCUMENTS

| | | | | |
|---|---|---|---|---|
| 1,924,741 A | * | 8/1933 | Shoulter et al. | 220/86.2 |
| 6,305,417 B1 | * | 10/2001 | Kleppner et al. | 137/565.34 |
| 2007/0207685 A1 | * | 9/2007 | Schaefer, Jr. | 440/88 F |
| 2008/0035649 A1 | * | 2/2008 | Ohlsson et al. | 220/564 |
| 2009/0223975 A1 | * | 9/2009 | McCallister | 220/563 |
| 2012/0006815 A1 | * | 1/2012 | Sendlhofer et al. | 220/4.14 |
| 2013/0019843 A1 | * | 1/2013 | Iwaya et al. | 123/512 |
| 2013/0193150 A1 | * | 8/2013 | Keefer | B64D 37/02 220/562 |
| 2013/0240055 A1 | * | 9/2013 | Zanek | 137/334 |

FOREIGN PATENT DOCUMENTS

| | | |
|---|---|---|
| CN | 2616421 Y | 5/2004 |
| CN | 2763109 Y | 3/2006 |
| CN | 101253064 A | 8/2008 |
| CN | 101316733 A | 12/2008 |
| CN | 201442515 U | 4/2010 |
| CN | 102361772 A | 2/2012 |
| CN | 202180744 U | 4/2012 |
| CN | 103057404 A | 4/2013 |
| DE | 10055670 A1 | 5/2002 |
| DE | 10214037 A1 | 10/2003 |

(Continued)

*Primary Examiner* — Jeffrey R Allen
*Assistant Examiner* — Jennifer Castriotta
(74) *Attorney, Agent, or Firm* — Jordan IP Law, LLC; Todd A. Vaughn

(57) ABSTRACT

A vehicle tank having a container and a pair of spaced apart baffle plates directly connected to walls of the container to define a swirl pot. The baffle plates have at least one orifice which lies spatially above the swirl pot, and within the swirl pot, the baffle plates have valves to allow an inflow of fuel into the swirl pot.

15 Claims, 1 Drawing Sheet

(56) References Cited

FOREIGN PATENT DOCUMENTS

| | | |
|---|---|---|
| FR | 2679840 A1 | 2/1993 |
| FR | 2796340 A1 | 1/2001 |
| WO | 2004009391 A1 | 1/2004 |
| WO | 2008105725 A1 | 9/2008 |
| WO | 2010108199 A2 | 9/2010 |
| WO | 2011045007 A2 | 4/2011 |

\* cited by examiner

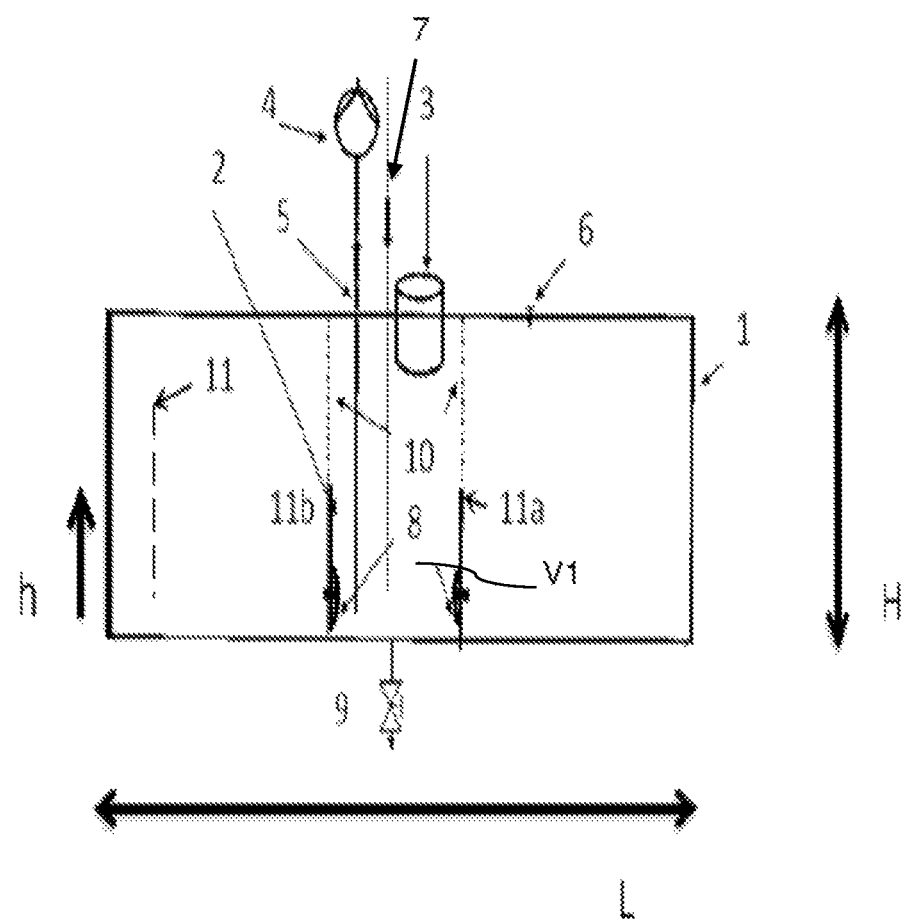

UTILITY VEHICLE TANK

CROSS-REFERENCE TO RELATED APPLICATIONS

The present application claims priority 35 U.S.C. § 119 to European Patent Publication No. EP13182105.0 (filed on Aug. 28, 2013) which is hereby incorporated by reference in its entirety.

TECHNICAL FIELD

Embodiments relate to a vehicle tank having a container with a cohesive volume and at least two baffle plates which extend perpendicularly to the longitudinal axis of the container. The baffle plates, which are directly and tightly connected with the walls of the container, collectively form a swirl pot.

BACKGROUND

If a tank is not completely filled with a fluid such as, for example, water, and is moved, sloshing movements of the fluid against the tank wall can occur in its interior. In unfavourable situations, a specific air quantity can be enclosed with these sloshing movements, which can cause clearly audible impacts. Such noises can occur in all types of fluidic movements in fluid-filled tanks, such as, for example, fuel containers of motor vehicles. Such noise behaviour can be of varying severity, depending on fuel type to be added.

Fuel containers are, for example, made from two metal shells, with an upper shell and a lower shell. Further components such as for example a swirl pot and labyrinth walls may be mounted in the lower shell to reduce the flow speed of the fuel in the suction region of the fuel pump. Then the upper and lower shells are welded together.

Complete evacuation of the fuel tank constitutes a problem. Because of the large size of the fuel tank for goods vehicles, substantial quantities of fuel remain in the tank which can no longer be extracted, or cannot be extracted in particular driving situations. Furthermore it is necessary to add a large quantity of fuel to the fuel tank when fuelling a goods vehicle, in order to guarantee a reliable starting of the engine. This applies in particular in the case of the first fuel fill of the goods vehicle in the manufacturer's works. A further problem is contamination of the fuel, which hinders extraction of the fuel down to minimum residual quantities.

WO 2008105725 discloses a fuel tank arrangement for a vehicle with a fuel tank in a main tank and a capture tank chamber. The main tank and the capture tank chamber are separated from each other by at least one partition wall. In order to guarantee a reliable fuel supply to the internal combustion engine, a valve mechanism is present within the partition wall which opens or closes depending on a fill level within the main tank, in response to the aspiration of fuel via the fuel supply line.

French Patent Publication No. FR 2679840 discloses a fuel tank in which an insert is provided which is filled depending on the road position of the vehicle. The suction line extracts fuel from the insert for the engine. This solution allows fuel to be introduced in the various driving situations, but does not solve the problem of the first fuel fill.

SUMMARY

In accordance with embodiments, a vehicle tank is provided which allows a reduced first fuel fill quantity and an optimised fuel extraction with a reduced residual quantity in the tank, taking into account contamination.

In accordance with embodiments, a vehicle tank comprises a container with a cohesive volume and at least two baffle plates which extend perpendicularly to the longitudinal axis of the container and which are directly and tightly connected to the walls of the container to collectively form a swirl pot. The baffle plates have at least one orifice which lies spatially above the formed swirl pot, and the baffle plates within the swirl pot have valves to allow the inflow of fuel into the swirl pot. The at least one orifice is formed as a sieve.

In accordance with embodiments, the proposed solution allows a reduction in the first fuel fill quantity by the vehicle manufacturer. Furthermore, due to the reduction in the unextracted residual quantity in the vehicle tank, an increase in range per tank fill is achieved, or alternatively, the overall tank volume and hence the vehicle weight can be reduced for the same range, without clogging due to contamination of the fuel.

In accordance with embodiments, advantageously, the swirl pot formed in the container is formed centrally in the container of the vehicle tank. By installing the swirl pot centrally, it is possible to evacuate both sides of the vehicle tank evenly.

In accordance with embodiments, advantageously, the suction line extending into the swirl pot is arranged spatially close or otherwise adjacent to the filler pipe. Positioning the suction line spatially close to the filler pipe gives an advantageous geometry with which the swirl pot can be filled and evacuated.

In accordance with embodiments, it is particularly advantageous if the suction line is arranged on the filler pipe or directly on a baffle plate. By integrating the two components structurally, the vehicle tank is significantly simplified.

In an advantageous embodiment, the valves are spring-loaded check valves. Here, it is advantageous if the check valves are spatially arranged as close as possible to the container base and swirl pot base. With this measure, it is possible to extract the residual quantity of fuel.

Advantageously, contamination is removed from the tank via a drain.

In accordance with embodiments, a vehicle tank comprises at least one of: a container having a volume; and at least two baffle plates which extend perpendicularly to a longitudinal axis of the container and which are directly connected to walls of the container to collectively form, with the walls, a swirl pot, the baffle plates having at least one orifice which lies spatially above the formed swirl pot, wherein, within the swirl pot, the baffle plates have valves to allow an inflow of fuel into the swirl pot.

In accordance with embodiments, a vehicle tank comprises at least one of: a container; a pair of spaced apart baffle plates directly connected to walls of the container to define a swirl pot, the baffle plates having at least one orifice which lies spatially above the swirl pot, wherein, within the swirl pot, the baffle plates have valves to allow an inflow of fuel into the swirl pot.

DRAWINGS

Embodiments will be illustrated by way of example in the drawings and explained in the description below.

FIG. 1 illustrates a diagrammatic depiction of a vehicle tank, in accordance with embodiments.

DESCRIPTION

FIG. 1 illustrates diagrammatically a motor vehicle tank 1. Such a tank 1, which appears as a rectangular crosssection in the drawing, is generally constructed as a container having cylindrical body. The container has a length L and a height H. The actual form of the container is not significant for embodiments. Such a motor vehicle tank 1 has baffle plates 11 to reduce sloshing movements within the volume of the tank 1.

In accordance with embodiments, a pair of spaced apart baffle plates 11a, 11b are installed spaced from the geometric centre of the tank 1. The baffle plates 11 extend from the underside or bottom of the tank 1 to the top, and at their respective undersides are tightly connected to the floor of the tank 1 and also tightly connected to the wall of the tank 1. The baffle plates 11a, 11b are impermeable up to a predetermined height h and without orifice. Above height h, the baffle plates extend with a plurality of orifices 10 formed as sieves to the top of the tank 1. A plurality of valves 8 may be arranged tightly on the underside of the tank 1. The valves 8 may be constructed as spring-loaded check valves, or alternatively, mushroom valves.

The baffle plates 11a, 11b and the tank 1 collectively form a swirl pot 2 which, up to height h, forms a predetermined volume V1 which can be filled initially independently of the fill level of the remaining tank 1. In the lower point up to a height h of around 250 mm, the baffle plates 11a, 11b have no orifices which open the swirl pot 2 to the remaining tank 1. The volume V1 of the swirl pot 2 is filled via a filler pipe or nozzle 3. A fuel pump 4 accesses the fuel in the volume of the swirl pot 2 via a suction line 5. The tank 1 is also provided with a roll over valve (ROV). A return line 7 also ends in the volume V1 of the swirl pot. The suction line 5 extends down as far as possible to the lowest point of the swirl pot 2, in order to guarantee as complete an evacuation as possible.

A vehicle engine is supplied with fuel via the fuel pump 4. This fuel is extracted from the swirl pot 2 which is arranged centrally in the tank 1, directly below the filler nozzle 3. During a fuel-filling process, in particular during the first fuel fill in the manufacturer's plant, the swirl pot 2 is filled first by the filler nozzle 3 and the arrangement of the swirl pot 2 centrally below the filler nozzle 3. On further filling, the fuel runs unhindered into the remaining space of the tank 1 through the orifices 10 of the baffle plate 11a, 11b. Thus, any coarse contamination is retained inside the swirl pot 2. Finer contaminants which enter the outer chambers of the tank 1 through the orifices 10 are gradually returned floating into the swirl pot 2 due to the movement of the fuel in operation, so that the contamination in the outer chambers of the tank 1 can be kept low. Any dirt or contaminants remaining in the swirl pot 2 can be removed from the tank 1 if required via the drain 9, by opening a valve.

During operation of the vehicle, fuel is aspirated from the swirl pot 2 and the fuel level in the tank 1 slowly falls. When the fuel level has fallen so far that no more fuel overflows from the remaining tank space into the swirl pot 2 through the sieves 10, the fuel level in the swirl pot 2 will then begin to fall. If the hydrostatic pressure in the remaining space of the tank 1 to the left and right of the swirl pot 2 is sufficiently great for the check valves 8 in the lower region of the baffle plates 11a, 11b to open, fuel will run from the remaining container 1 into the swirl pot 2. If the tank 1 is in a spatially sloping position, only the check valve 8 which sees a pressure difference between the swirl pot 2 and the remaining tank 1 will open. Since the valves 8 only open under the established pressure difference and do not have to be controlled, the method is greatly simplified in comparison with other actively controlled solutions, and hence designed more robustly. The openings of the valves 8 are not fitted with orifices 10, so even fine contaminants can also be flushed out of the tank 1 into the swirl pot 2.

In this way the fill levels between the outer chambers in accordance with embodiments and the swirl pot 2 can be balanced. With the arrangement in accordance with embodiments, for the first fuel fill of goods vehicles, up to 80% of the fuel quantity previously required can be saved.

At present, certain vehicles require up to 80 liters of fuel in order in principle to drive out of the production hall. With the swirl pot 2 in accordance with embodiments, and its arrangement in the tank 1, it is possible to reduce this quantity to 20%. In addition, the residual quantity which cannot be extracted and remains in the tank 1 during operation is reduced by around 50%, the valves 8 open even at a sloping position, and the fluid level is balanced from the tank 1 into the swirl pot 2. As a result, either for the same fill quantity, the range per tank volume is significantly increased, giving a driving time extension of around 1.5 hours, or the tank volume can be reduced to the same extent, which leads to a reduction in the total weight. The residual quantity can be extracted without difficulty due to the arrangement of the sieves in the orifices 10, since the contaminants are collected and removed via the drain which contains a valve.

To further optimise the vehicle tank 1, in an alternative solution the components of the filler pipe and the suction line are integrated into one component, or at least installed via a common opening of the tank 1.

A further advantageous embodiment results from the structural integration of the filler nozzle 3 with a baffle plate 11. The integration of the suction line in a baffle plate 11 is also conceivable.

If the tank is made from plastic by rotational sintering, the baffle plates 11a, 11b are produced at the same time. In this way, lines can easily be provided along the baffle plates to serve as suction lines or as the filler pipe.

In accordance with embodiments, metal or plastic can be used as the material of the vehicle tank 1. Combinations of the two materials are also conceivable. The tank 1 is produced integrally or in several pieces.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Tank
2 Swirl pot
3 Filler pipe
4 Fuel pump
5 Suction line
6 ROV
7 Return line
8 Valve 9 Drain
10 Sieve
11 Baffle plate
11a Baffle plate
11b Baffle plate

What is claimed is:

1. A vehicle tank, comprising:
a container;
baffle plates which extend perpendicularly to a longitudinal axis of the container and which are directly connected to walls of the container to collectively form, with the walls, a swirl pot;
a filler pipe on the container to permit filling of the vehicle tank; and
a suction line structurally integrated with the filler pipe, and which extends to the lowest point of the swirl pot to permit evacuation of fuel from the swirl pot,
wherein:
above a predetermined height to the top of the container, the entire surface of each baffle plate has orifices formed as sieves to retain coarse contaminates inside the swirl pot; and
below the predetermined height the baffle plates do not have orifices formed as sieves, and respectively have a first valve and a second valve at a lowest point thereof to allow an inflow of fuel into the swirl pot from outer chambers of the container due to a detected hydrostatic pressure difference between a corresponding outer chamber and the swirl pot.

2. The vehicle tank of claim 1, wherein the swirl pot is formed centrally in the container.

3. The vehicle tank of claim 1, wherein the first valve and the second valve comprises check valves.

4. The vehicle tank of claim 1, wherein the first valve and the second valve are spatially arranged adjacent to the container base and a base of the swirl pot.

5. The vehicle tank of claim 1, further comprising a third valve to permit fuel drainage and which is arranged on a base of the swirl pot.

6. A vehicle tank, comprising:
a container;
a pair of spaced apart baffle plates directly connected to walls of the container to define a swirl pot;
a filler pipe on the container to permit initial filling of the swirl pot independently of a fill level of the vehicle tank; and
a suction line structurally integrated with the filler pipe, and which extends into the swirl pot to permit evacuation of fuel from the swirl pot,
wherein:
above a predetermined height to the top of the container, the entire surface of each baffle plate has orifices formed as sieves to retain coarse contaminates inside the swirl pot; and
below the predetermined height the baffle plates do not have orifices formed as sieves, and respectively have a first valve and a second valve at a lowest point thereof to allow an inflow of fuel into the swirl pot from outer chambers of the container due to a detected hydrostatic pressure difference between a corresponding outer chamber and the swirl pot.

7. The vehicle tank of claim 6, wherein the swirl pot is formed centrally in the container.

8. The vehicle tank of claim 6, wherein the first valve and the second valve comprises check valves.

9. The vehicle tank of claim 6, wherein the first valve and the second valve are spatially arranged adjacent to the container base and a base of the swirl pot.

10. The vehicle tank of claim 6, further comprising a third valve to permit fluid drainage from and which is arranged on a base of the swirl pot.

11. A vehicle tank, comprising:
a container; and
a first baffle plate arranged within the container, and having a first valve arranged at a lowest point thereof, and at a height greater than the first valve to the top of the container, the entire surface of the first baffle plate has first orifices formed as sieves; and
a second baffle plate arranged spaced apart from the first baffle plate within the container to collectively form, with walls of the container, outer container chambers and a swirl pot arranged centrally between the outer chambers, and having a second valve arranged at a lowest point thereof, and at a height greater than the second valve to the top of the container, the entire surface of the second baffle plate has second orifices formed as sieves in its entirety to the top of the container;
a filler pipe to permit initial filling of the swirl pot independently of a fill level of the vehicle tank; and
a suction line structurally integrated with the filler pipe, and which extends into the swirl pot to permit evacuation of fuel from the swirl pot,
wherein the first orifices and the second orifices are to permit a flow of fuel from the swirl pot into the outer chambers and retain coarse contaminates inside the swirl pot, and the first valve and the second valve are to permit, due to a detected hydrostatic pressure difference between a corresponding outer chamber and the swirl pot, a flow of fuel from the outer chambers into the swirl pot.

12. The vehicle tank of claim 11, wherein the swirl pot is formed centrally in the container.

13. The vehicle tank of claim 11, wherein the first valve and the second valve each comprise check valves.

14. The vehicle tank of claim 11, wherein the first valve and the second valve are spatially arranged adjacent to the container base and a base of the swirl pot.

15. The vehicle tank of claim 11, further comprising a third valve to permit fuel drainage and which is arranged on a base of the swirl pot.

* * * * *